(12) United States Patent
Yoshioka et al.

(10) Patent No.: US 11,979,874 B2
(45) Date of Patent: May 7, 2024

(54) TERMINAL AND RADIO COMMUNICATION METHOD

(71) Applicant: NTT DOCOMO, INC., Tokyo (JP)

(72) Inventors: Shohei Yoshioka, Tokyo (JP); Yuki Takahashi, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 376 days.

(21) Appl. No.: 17/624,466

(22) PCT Filed: Jul. 4, 2019

(86) PCT No.: PCT/JP2019/026720
§ 371 (c)(1),
(2) Date: Jan. 3, 2022

(87) PCT Pub. No.: WO2021/002012
PCT Pub. Date: Jan. 7, 2021

(65) Prior Publication Data
US 2022/0361200 A1    Nov. 10, 2022

(51) Int. Cl.
*H04W 72/1268*    (2023.01)
*H04W 72/23*    (2023.01)

(52) U.S. Cl.
CPC ....... *H04W 72/1268* (2013.01); *H04W 72/23* (2023.01)

(58) Field of Classification Search
CPC .......................... H04W 72/23; H04W 72/1268
USPC .......................................................... 370/329
See application file for complete search history.

(56) References Cited

U.S. PATENT DOCUMENTS

| | | | |
|---|---|---|---|
| 2022/0021497 A1* | 1/2022 | Bai | H04L 27/2605 |
| 2022/0149930 A1* | 5/2022 | Rolle | H04L 5/0044 |

FOREIGN PATENT DOCUMENTS

WO    2019/102531 A1    5/2019

OTHER PUBLICATIONS

Office Action issued in the counterpart Japanese Patent Application No. 2021-529674, mailed on Jun. 6, 2023 (4 pages).

(Continued)

*Primary Examiner* — Peter G Solinsky
(74) *Attorney, Agent, or Firm* — Osha Bergman Watanabe & Burrton LLP

(57) ABSTRACT

A terminal according to an aspect of the present disclosure includes a control section that determines, in a case where a physical uplink shared channel (PUSCH) spans two durations across a boundary in a time domain, a configuration of a phase tracking reference signal (PTRS) during each of the two durations, and a transmitting section that transmits the PUSCH. According to an aspect of the present disclosure, even in a case where a signal/channel is transmitted over a plurality of slots, a reference signal can be appropriately transmitted.

7 Claims, 12 Drawing Sheets

(56) References Cited

OTHER PUBLICATIONS

Sharp; "PUSCH enhancements for NR URLLC"; 3GPP TSG RAN WG1 Meeting #97, R1-1907221; Reno, USA; May 13-17, 2019 (9 pages).
International Search Report issued in PCT/JP2019/026720 on Feb. 18, 2020 (2 pages).
Written Opinion of the International Searching Authority issued in PCT/JP2019/026720 on Feb. 18, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 8)"; Mar. 2010 (149 pages).

\* cited by examiner

| $\tilde{p}$ | CDM group | Δ | $w_f(k')$ | | $w_t(l')$ | |
|---|---|---|---|---|---|---|
| | | | $k'=0$ | $k'=1$ | $l'=0$ | $l'=1$ |
| 0 | 0 | 0 | +1 | +1 | +1 | +1 |
| 1 | 0 | 0 | +1 | -1 | +1 | +1 |
| 2 | 1 | 1 | +1 | +1 | +1 | +1 |
| 3 | 1 | 1 | +1 | -1 | +1 | +1 |
| 4 | 0 | 0 | +1 | +1 | +1 | -1 |
| 5 | 0 | 0 | +1 | -1 | +1 | -1 |
| 6 | 1 | 1 | +1 | +1 | +1 | -1 |
| 7 | 1 | 1 | +1 | -1 | +1 | -1 |

FIG. 7

| $\tilde{p}$ | CDM group | Δ | $w_f(k')$ | | $w_t(l')$ | |
|---|---|---|---|---|---|---|
| | | | $k'=0$ | $k'=1$ | $l'=0$ | $l'=1$ |
| 0 | 0 | 0 | +1 | +1 | +1 | +1 |
| 1 | 0 | 0 | +1 | -1 | +1 | +1 |
| 2 | 1 | 2 | +1 | +1 | +1 | +1 |
| 3 | 1 | 2 | +1 | -1 | +1 | +1 |
| 4 | 2 | 4 | +1 | +1 | +1 | +1 |
| 5 | 2 | 4 | +1 | -1 | +1 | +1 |
| 6 | 0 | 0 | +1 | +1 | +1 | -1 |
| 7 | 0 | 0 | +1 | -1 | +1 | -1 |
| 8 | 1 | 2 | +1 | +1 | +1 | -1 |
| 9 | 1 | 2 | +1 | -1 | +1 | -1 |
| 10 | 2 | 4 | +1 | +1 | +1 | -1 |
| 11 | 2 | 4 | +1 | -1 | +1 | -1 |

FIG. 8

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems, studies have been conducted about transmission, by user terminal ((UE) User Equipment), of at least one of a given channel and a given signal (channel/signal) across a slot boundary (over a plurality of slots) on a given transmission occasion (also referred to as a period, a duration, an occasion, repetition, and so on).

The channel/signal may be, for example, an uplink shared channel (for example, Physical Uplink Shared Channel (PUSCH)) or a downlink shared channel (for example, Physical Downlink Shared Channel (PDSCH)).

However, in a case where the signal/channel is transmitted over a plurality of slots, a problem is how to transmit a reference signal.

Thus, an object of the present disclosure is to provide a terminal and a radio communication method that can appropriately transmit a reference signal even in a case where a signal/channel is transmitted over a plurality of slots.

Solution to Problem

A terminal according to an aspect of the present disclosure includes a control section that determines, in a case where a physical uplink shared channel (PUSCH) spans two durations across a boundary in a time domain, a configuration of a phase tracking reference signal (PTRS) during each of the two durations, and a transmitting section that transmits the PUSCH.

Advantageous Effects of Invention

Thus, according to an aspect of the present disclosure, even in a case where a signal/channel is transmitted over a plurality of slots, a reference signal can be appropriately transmitted.

BRIEF DESCRIPTION OF DRAWINGS

FIG. 7 is a diagram to show an example of parameters for PUSCH DMRS configuration type 1;

FIG. 8 is a diagram to show an example of parameters for PUSCH DMRS configuration type 2;

DESCRIPTION OF EMBODIMENTS (Multi-Segment Transmission)

For NR (for example, 3GPP Rel. 15), studies have been conducted about allocation, by a user terminal ((UE) User Equipment), of time domain resources (for example, a given number of symbols) to an uplink shared channel (for example, Physical Uplink Shared Channel (PUSCH)) or a downlink shared channel (for example, Physical Downlink Shared Channel(PDSCH)) on a given transmission occasion (also referred to as a period, a duration, an occasion, and so on) within a single slot.

For example, the UE may transmit one or a plurality of transport blocks (TBs) on a given transmission occasion using the PUSCH allocated to a given number of consecutive symbols within a slot. The UE may transmit one or a plurality of TBs on a given transmission occasion using the PDSCH allocated to a given number of consecutive symbols within a slot.

On the other hand, for NR (for example, Rel. 16 or later versions), time domain resources (for example, a given number of symbols) are expected to be allocated to the PUSCH or PDSCH on a given transmission occasion across a slot boundary (over a plurality of slots).

Multi-segment transmission, two-segment transmission, cross slot boundary transmission, discontinuous transmission, multi-division transmission, and so on refer to transmission of at least one of a channel and a signal (channel/signal) in an uplink (UL) or a downlink (DL) using time domain resources allocated across the slot boundary (over a plurality of slots) on a given transmission occasion. Similarly, reception of the channel/signal in the UL or DL across the slot boundary is also referred to as multi-segment reception, two-segment reception, cross slot boundary reception, discontinuous reception, multi-division reception, and so on.

Figure 1:
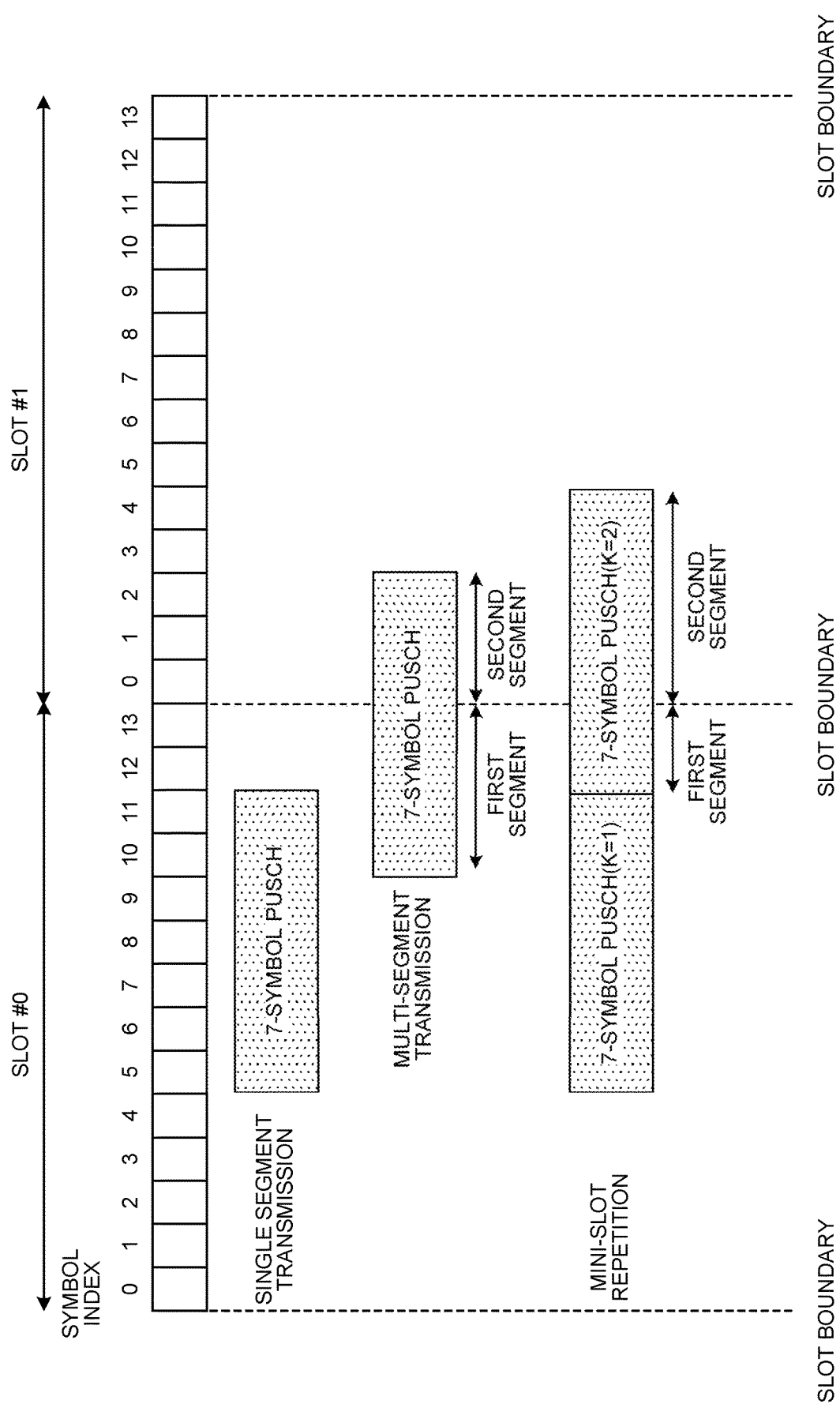
FIG. 1 is a diagram to show an example of multi-segment transmission.

FIG. 1 is a diagram to show an example of multi-segment transmission. Note that FIG. 1 illustrates multi-segment transmission of the PUSCH but that of course, the present embodiment can be applied to another signal/channel (for example, the PDSCH or the like).

In FIG. 1, the UE may control transmission of the PUSCH allocated within one slot or over a plurality of slots based on a given number of segments. Specifically, in a case where time domain resources over one or more slots are allocated to the PUSCH on a given transmission occasion, the UE may map the segments to a given number of allocation symbols within the corresponding slots.

In this regard, "segments" may be a given number of symbols within each slot allocated to one transmission occasion or data transmitted in the given number of symbols. For example, in a case where a leading symbol of the PUSCH allocated on one transmission occasion is a first slot and a trailing symbol is a second slot, one or more symbols included in the first slot may be first segments, and one or more symbols included in the second slot may be second segments, for the PUSCH.

Note that the "segment" is a given data unit and may be at least a part of one or a plurality of TBs. For example, each segment may include one or a plurality of TBs, one or a plurality of code blocks (CBs), or one or a plurality of coded block groups (CBGs). Note that one CB may be a unit for coding of TBs and corresponds to one or more pieces into which the TB is divided (CB segmentation). One CGB may include a given number of CBs.

The size (the number of bits) of each segment may be, for example, determined based on at least one of the number of slots to which the PUSCH is allocated, the number of allocation symbols in each slot, and the rate of the number of allocation symbols in each slot. The number of segments may be determined based on the number of slots to which the PUSCH is allocated.

For example, the PUSCH allocated to symbols #5 to #11 in slot #0 is transmitted within a single slot (single segment) without crossing a slot boundary. Thus, transmission of the PUSCH without crossing the slot boundary (transmission of the PUSCH using a given number of symbols allocated within a single slot) may be referred to as single-segment transmission, one-segment transmission, non-segmented transmission, and so on.

On the other hand, the PUSCH allocated to symbols #10 to #13 in slot #0 and to symbols #0 to #2 in slot #1 is transmitted across the slot boundary. Thus, transmission of the PUSCH across the slot boundary (transmission of the PUSCH using a given number of symbols allocated within a plurality of slots) may be referred to as multi-segment transmission, two-segment transmission, cross slot boundary transmission, and so on.

As shown in FIG. 1, in a case where repeated transmissions of the PUSCH are performed over a plurality of transmission occasions, multi-segment transmission may be applied to at least some of the transmission occasions. For example, in FIG. 1, the PUSCH (transport block (TB)) is repeated twice, single-segment transmission is applied to the first PUSCH transmission, and multi-segment transmission is applied to the second PUSCH transmission.

Note that FIG. 1 illustrates seven-symbol PUSCHs but that the number of symbols allocated to the PUSCH is not limited to seven.

The repeated transmissions may be performed in one or more time units. Each of the transmission occasions may be provided in each time unit. Each time unit may be, for example, a slot or a time unit shorter than the slot (also referred to as, for example, a mini-slot, sub-slot, a half slot, and so on). For example, FIG. 1 shows repeated transmissions using seven-symbol mini-slots. However, the unit of the repeated transmissions is not limited to the unit shown in FIG. 1.

The number of repeated transmissions being one may indicate one transmission of the PUSCH, PDSCH, or TB (no repetition).

The repeated transmissions may also be referred to as slot-aggregation transmission, multi-slot transmission, or the like. The number of repetitions (the number of aggregations or an aggregation factor) N may be specified for the UE by using at least one of a higher layer parameter (for example, an RRC IE "pusch-AggregationFactor" or "pdsch-AggregationFactor") and DCI. The transmission occasion, repetition, slots or mini-slots, and the like can be rephrased as one another.

One of a plurality of repetitions may be divided into a plurality of repetitions (a plurality of segments) at the boundary between slots or UL durations.

Figure 2:
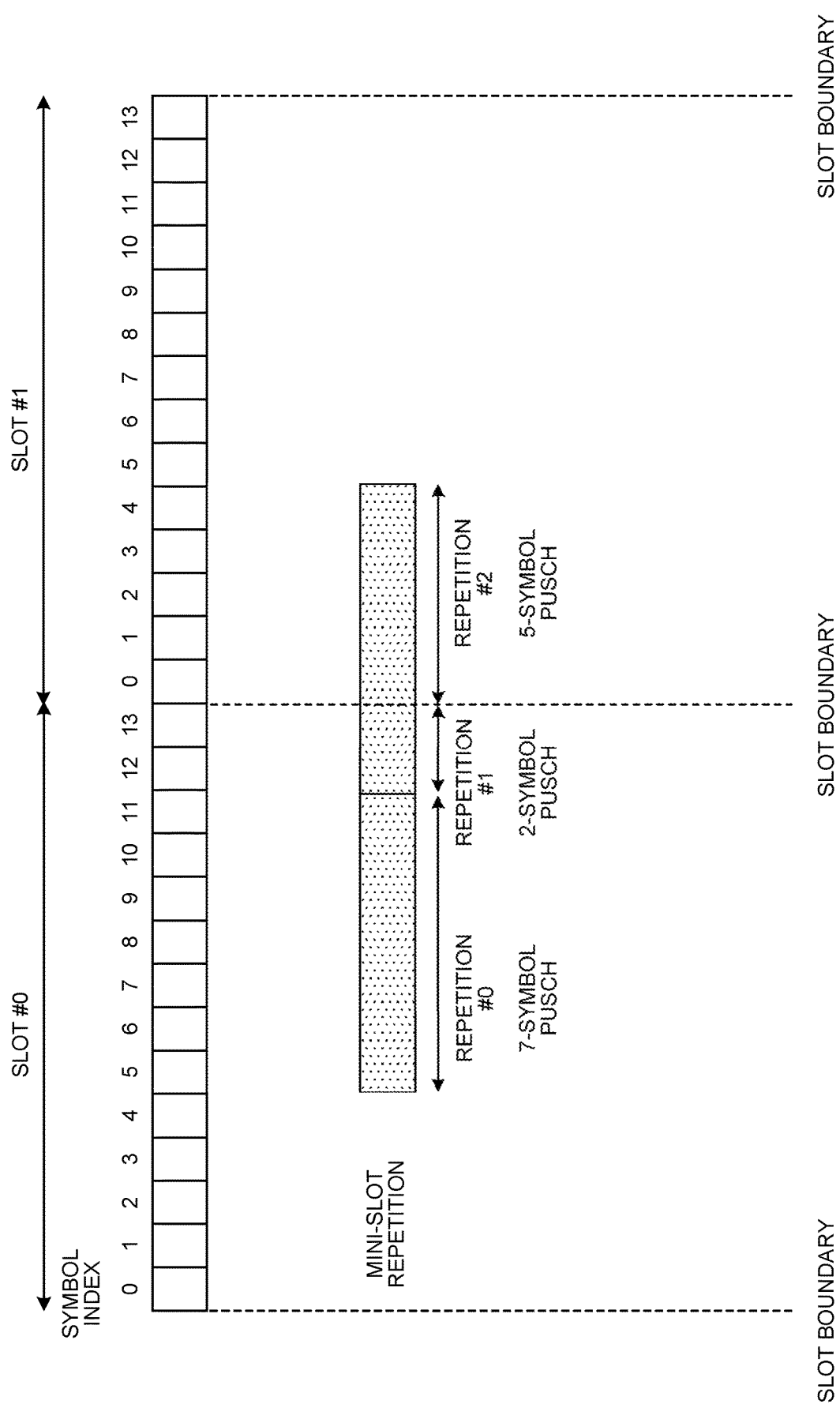
FIG. 2 is a diagram to show an example of multi-segment transmission in PUSCH repetition.

As shown in FIG. 2, the repetition succeeding repetition #0 over symbols #5 to #11 in slot #0 may be divided into repetition #1 over symbols #12 and #13 in slot #0 and repetition #2 over symbols #0 to #4 in slot #1.

In a case where a DMRS with a preceding DMRS only (front-loaded-only) is configured, the DMRS may be transmitted at the start of each repetition.

(PTRS)

In Rel-15 NR, a base station may transmit a phase tracking reference signal (PTRS) in the downlink. The base station may continuously or discontinuously map the PTRS to a given number of (for example, one) subcarriers in the time direction to transmit.

The UE may receive, for example, the PTRS during at least a part of the duration for which the downlink shared channel (Physical Downlink Shared Channel (PDSCH)) is scheduled (slot, symbol, or the like) (in other words, the duration during which the PDSCH is received). The PTRS transmitted by the base station may also be referred to as a DL PTRS.

The UE may transmit the PTRS in the uplink. The UE may continuously or discontinuously map the PTRS to a given number of (for example, one) subcarriers in the time direction to transmit.

The UE may transmit the PTRS, for example, during at least a part of the duration for which the uplink shared channel (Physical Uplink Shared Channel (PUSCH)) is scheduled (slot, symbol, or the like) (in other words, the duration during which the PUSCH is transmitted). The PTRS transmitted by the UE may also be referred to as a UL PTRS.

The base station or the UE may determine phase noise based on the received PTRS and correct a phase error in a reception signal (for example, the PUSCH or PDSCH).

For the UE, PTRS configuration information (PTRS-DownlinkConfig for DL and PTRS-UplinkConfig for UL) may be configured using higher layer signaling. For example, the PTRS configuration information may be included in configuration information (DMRS-DownlinkConfig or DMRS-UplinkConfig) regarding a demodulation reference signal (DMRS) for the PDSCH or PUSCH.

The higher layer signaling as used herein may be, for example, any one or combinations of Radio Resource Control (RRC) signaling, Medium Access Control (MAC) signaling, broadcast information, and the like.

For example, the MAC signaling may use MAC control elements (MAC CE), MAC Protocol Data Units (PDUs), and the like. The broadcast information may be, for example, master information blocks (MIBs), system information blocks (SIBs), minimum system information (Remaining Minimum System Information (RMSI)), other system information (OSI), and the like.

The PTRS configuration information may include information used to determine the time density of the PTRS (for example, an RRC parameter "timeDensity" field). This information may be referred to as time density information. The time density information may indicate, for example, a threshold related to the time density described below (for example, at least one of ptrs-MCS$_1$, ptrs-MCR$_2$, ptrs-MCS$_3$, and ptrs-MCS$_4$).

The PTRS configuration information may include information used to determine the frequency density of the PTRS (for example, an RRC parameter "frequencyDensity" field). This information may be referred to as frequency density information. The frequency density information may indicate, for example, a threshold related to the frequency density described below (for example, at least one of $N_{RB0}$ and $N_{RB1}$).

In the PTRS configuration information, different values may be configured for the DL PTRS and for the UL PTRS. The PTRS configuration information may be configured for the UE for each Bandwidth Part (BWP) within the cell, or common PTRS configuration information may be configured for BWPs (cell-specific).

In a case where no PTRS configuration information is configured (reported) (for example, before RRC connection), the UE may assume the absence of the PTRS (no PTRS is included in the transmitted or received signal). In a case where the PTRS configuration information is configured (reported) (for example, after RRC connection), the UE may determine a PTRS pattern (at least one of the time density and the frequency density) based on the downlink control information (DCI) detected.

For example, in a case where at least one of the time density information and the frequency density information is configured, and a radio network temporary identifier (RNTI) used for cyclic redundancy check (CRC) scrambling for the DCI is a particular RNTI (for example, a Cell-RNTI (C-RNTI) or a Configured Scheduling RNTI (CS-RNTI)), the UE may assume the presence of an antenna port for the PTRS and determine the PTRS pattern based on a scheduled MCS and a scheduled bandwidth that are scheduled in accordance with the DCI.

The UE may determine an MCS index ($I_{MCS}$) based on a Modulation and Coding Scheme (MCS) field of the DCI, and determine the time density $L_{PT-RS}$ of the PTRS based on the $I_{MCS}$ and a threshold related to the time density described above.

For example, the UE may determine $L_{PT-RS}$ as follows.
in a case where $I_{MCS}$<ptrs-MCS$_1$, the PTRS is assumed to be absent,
in a case where ptrs-MCS$_1$≤$I_{MCS}$<ptrs-MCS$_2$, $L_{PT-RS}$=4,
in a case where ptrs-MCS$_2$≤$I_{MCS}$<ptrs-MCS$_3$, $L_{PT-RS}$=2, and
in a case where ptrs-MCS$_3$≤$I_{MCS}$<ptrs-MCS$_4$, $L_{PT-RS}$=1.

The correspondence relationship between the MCS index and the time density of the PTRS is not limited to the above-described relationship. For example, the number of thresholds may be less or greater than four. Note that a smaller value of $L_{PT-RS}$ may mean a higher density and that the value of $L_{PT-RS}$ may indicate, for example, the allocation intervals of PTRS symbols.

The UE may determine the number of resource blocks ($N_{RB}$) to be scheduled based on a frequency domain resource allocation field in the DCI, and determine the frequency density $K_{PT-RS}$ of the PTRS based on the $N_{RB}$ and the above-described threshold related to the frequency density.

For example, the UE may determine $K_{PT-RS}$ as follows.
in a case where $N_{RB}$<$N_{RB0}$, the PTRS is assumed to be absent,
in a case where $N_{RB0}$≤$N_{RB}$<$N_{RB1}$, $K_{PT-RS}$=2, and
in a case where $N_{RB1}$≤$N_{RB}$, $K_{PT-RS}$=4.

The correspondence relationship between the bandwidth to be scheduled and the frequency density of the PTRS is not limited to the above-described relationship. For example, the number of thresholds may be less or greater than two. Note that a smaller value of $K_{PT-RS}$ may mean a higher density and that the value of $K_{PT-RS}$ may indicate, for example, the allocation intervals of PTRS subcarriers.

In a case where no time density information is configured, the UE may assume that $L_{PT-RS}$ is a given value (for example, 1). In a case where no frequency density information is configured, the UE may assume that $K_{PT-RS}$ is a given value (for example, 2). Note that the given values related to $L_{PT-RS}$ and $K_{PT-RS}$ may be given or configured through higher layer signaling.

In a case where transform precoding (DFT-s-OFDM) is disabled, generation of a pseudo-random sequence c(i) for a sequence r(n) of PT-RSs is based on a slot $n_{s,f}^\mu$, as expressed by the equation below.

$$r(m)=1/\sqrt{2}(1-2c(2n))+j/\sqrt{2}(1-2c(2n+1)) \quad \text{(Equation 1)}$$

c(i) is initialized in accordance with the equation below.

$$c_{init}=(2^{17}(N^{symbslot}n_{s,f}^\mu+l+1)(2N_{ID}^{nSCID}+nSCID)+N_{ID}^0) \bmod 2^{31} \quad \text{(Equation 2)}$$

In a case where transform precoding is enabled, $r_m(m')$ corresponding to PT-RS is given by the equation below.

$$r_m(m')=w(k')\exp(j\pi/2(m \bmod 2))/\sqrt{2}[(1-2c(m'))+j(1-2c(m'))] \quad \text{(Equation 3)}$$

m'=$N_{samp}^{group}$s'+k'
s'=0, 1, . . . , $N_{group}^{PT-RS}$-1
k'=0, 1, . . . , $N_{samp}^{group}$-1
Here, $N_{group}^{PT-RS}$ is the number of PT-RS groups. Here, $N_{samp}^{group}$ is the number of samples per PT-RS group.

c(i) is initialized in accordance with the equation below.

$$c_{init}=(2^{17}(N^{symbslot}n_{s,f}^\mu+l+1)(2N_{ID}+1)+2N_{ID}) \bmod 2^{31} \quad \text{(Equation 4)}$$

Here, $N_{symb}^{slot}$ is the number of symbols within a slot. $N_{ID}$ is provided through a higher layer parameter (nPUSCH-Identity).

(DMRS)

In NR, for the time domain, a plurality of types of demodulation reference signals (DMRSs) for the PUSCH or PDSCH may be supported. Specifically, for a time domain structure of DMRS for the PUSCH or PDSCH, a plurality of types (for example, types A and B) with different positions of a symbol for the first DMRS (DMRS symbol) may be supported.

In the type A (also referred to as a mapping type A, a first type, and so on), the DMRS may be mapped relative to the start of the slot (slot boundary) regardless of where within the slot data transmission is started.

Specifically, in the type A, the position $l_0$ of the first DMRS symbol may be indicated by a position relative to a reference point 1 corresponding to the start of the slot. The position 10 may be given by a higher layer parameter (for example, Radio Resource Control (RRC) information element (IE) "dmrs-TypeA-Position"). The position $l_0$ may be, for example, 2 or 3. Note that the RRC IE may be rephrased as an RRC parameter or the like.

On the other hand, in the type B (also referred to as a mapping type B, a second type, and so on), the DMRS may be mapped based on the symbol where data transmission is started within the slot. In the type B, the position $l_0$ of the first DMRS symbol may be indicated by a position relative to the start (first symbol) 1 of the time domain resources allocated to the PDSCH or PUSCH. The position $l_0$ may be, for example, 0.

Which of the type A or the type B is to be applied may be determined by at least one of the higher layer parameter and the downlink control information (DCI).

In either of the types A and B, the slot may be internally provided with a given number of additional DMRS symbols in addition to the first DMRS symbol. For example, the slot may be internally provided with a given number (for example, up to three) of additional DMRS symbols relative to the first DMRS symbol.

In the case where transform precoding (DFT-s-OFDM) is disabled, generation of a pseudo-random sequence c(i) for a sequence r(n) is based on a slot $n_{s,f}^\mu$, as expressed by the equation below.

$$r(m)=1/\sqrt{2}(1-2c(2n))+j/\sqrt{2}(1-2c(2n+1)) \quad \text{(Equation 5)}$$

c(i) is initialized in accordance with the equation below.

$$c_{init}=(2^{17}(N^{symbslot}n_{s,f}^\mu+l+1)(2N_{ID}^{nSCID}+1)+ 2N_{ID}^{nSCID}+n_{SCID}) \bmod 2^{31} \quad \text{(Equation 6)}$$

In this regard, in a case where the PUSCH is scheduled by DCI format 0_1 or PUSCH transmission of configured grant and $N_{ID}^0$ and $N_{ID}^1$ are provided, $N_{ID}^0$ and $N_{ID}^1$ are given by the higher layer parameters (scramblingID0 and scramblingID1 in DMRS-UplinkConfig). In a case where the PUSCH is scheduled by DCI format 0_0 and $N_{ID}^0$ is provided, $N_{ID}^0$ is given by the higher layer parameter (scramblingID0 in DMRS-UplinkConfig). Otherwise, $N_{ID}^{nSCID}$ is a physical layer cell ID ($NID_{cell}$). $n_{SCID}$ is 0 or 1 indicated by a DMRS initialization field or the higher layer parameter (dmrs-SeqInitialization), or otherwise 0.

In a case where transform precoding is enabled, group hopping or sequence hopping is based on the slot $n_{s,f}^\mu$ as in the equation below.

$$r(n)=r_{u,v}^{(\alpha,\delta)}(n) \quad \text{(Equation 7)}$$

$$u=(f_{gh}+n_{ID}^{RS}) \bmod 30 \quad \text{(Equation 8)}$$

In a case where the group hopping is enabled and the sequence hopping is disabled, $f_{gh}$ and v are given by the equation below.

$$f_{gh}=(\Sigma_{m=0}^{7} 2^m c(8(N_{symb}^{slot}n_{s,f}^\mu+l)+m)) \bmod 30 \quad \text{(Equation 9)}$$

$$v=0 \quad \text{(Equation 10)}$$

In a case where the sequence hopping is enabled and the group hopping is disabled, $f_{gh}$ and v are given by the equation below.

$$f_{gh}=0 \quad \text{(Equation 11)}$$

$$\text{for } M_{ZC} \geq 6N_{sc}^{RB}, v=c(N_{symb}^{slot}n_{s,f}^\mu+l) \quad \text{(Relation 12)}$$

Otherwise, v=0.

(RS in Multi-Segment Transmission)

In a case where the PTRS is configured, how to deal with the PTRS on the segmented PUSCH is not clear. The time density may depend on the MCS index and the higher layer parameter. The frequency density may depend on the scheduled PRB and the higher layer parameter. For multiple input multiple output (MIMO), the maximum number of PTRS ports may be configured though higher layer signaling, and association between a PTRS port and a DMRS port may be indicated by a PTRS-DMRS association field. PTRS transmission power may be determined based on at least one of the higher layer parameter (UL PTRS power boosting factor (ptrs-Power or $\alpha_{PTRS}^{PUSCH}$)), a PTRS scaling factor ($\beta_{PTRS}$), and a precoding information and number of layers field in the DCI (for example, a DCI format for scheduling of the PUSCH or DCI format 0_1).

How to generate a DMRS sequence for the segmented PUSCH is not clear.

As described above, sufficient studies have not been conducted about how to transmit the reference signal in a case where the UE transmits the PUSCH over a plurality of slots. In a case where this method is not definitely specified, the accuracy of phase trackability and channel estimation, and the like may decrease, degrading the performance of the PUSCH.

Thus, the inventors of the present invention came up with a method for appropriately transmitting the reference signal in a case where the UE transmits the PUSCH over a plurality of slots.

Embodiments according to the present disclosure will be described in detail with reference to the drawings as follows. The radio communication method according to each embodiment may be employed independently or at least two methods thereof may be employed in combination.

(Radio Communication Method)

The repetition, PUSCH, and TB may be interchangeably interpreted in the present disclosure. The repetition with segmentation, segmentation repetition, and repetition across the slot boundary may be interchangeably interpreted in the present disclosure. The repetition without segmentation, non-segmentation repetition, and repetition without crossing the slot boundary may be interchangeably interpreted in the present disclosure. The duration, slot, sub-slot, and mini-slot may be interchangeably interpreted in the present disclosure.

Embodiment 1

PTRS configuration in the repetition with segmentation (a plurality of segment) may be the same as PTRS configuration for the repetition without segmentation. The value of a particular parameter in the repetition with segmentation may be the same as the value of a parameter for the PTRS for the repetition without segmentation. At least one of the UE and the base station may determine the particular parameter in the repetition with segmentation based on a particular parameter for the PTRS for the repetition without segmentation.

<<Sequence>>

At least one of the UE and the base station may determine a PTRS sequence in the repetition with segmentation in accordance with at least one of PTRS sequence determination methods 1-1 to 1-3 described below.

[PTRS Sequence Determination Method 1-1]

The PTRS sequence in the repetition with segmentation may be determined based on a PTRS sequence in the repetition without segmentation. For example, the PTRS sequence in the repetition with segmentation may be determined from transmission parameters obtained before division into a plurality of transmissions due to crossing of the slot boundary.

[PTRS Sequence Determination Method 1-2]

The PTRS sequence may be determined based on the preceding or succeeding repetition (the index of the segment, for example, the preceding or succeeding slot). The PTRS sequence in one of two segments may be determined based on the PTRS sequence in the other segment. For example, in a case where the repetition is divided into a first segment and a second segment by the slot boundary, the PTRS sequence in the second segment of a slot $n_{s,f}^\mu$ may be based on the PTRS sequence in the first segment of a slot $n_{s,f}^\mu-1$ (the PTRS sequences may be the same), and the PTRS sequence in the first segment of a slot $n_{s,f}^\mu$ may be based on the PTRS sequence in the second segment of a slot $n_{s,f}^\mu+1$ (the PTRS sequences may be the same).

$n_{s,f}^\mu$ may be a slot number within a frame in a subcarrier spacing configuration (numerology)μ.

[PTRS Sequence Determination Method 1-3]

The PTRS sequence may be determined based on each slot. For example, an equation for generation of a PTRS sequence may include the slot number $n_{s,f}^\mu$. The PTRS sequence in the repetition with segmentation may vary with slot (segment). The equation for generation of a PTRS sequence in the repetition with segmentation may be the same as the equation for generation of a PTRS sequence in the repetition without segmentation.

<<Time Domain Position>>

At least one of the UE and the base station may determine a parameter for at least one of the time domain position, time density, and presence of the PTRS in the repetition with segmentation in accordance with at least one of time domain position determination methods 1-1 and 1-2 described below.

<<Time Domain Position Determination Method 1-1>>

The parameter for at least one of the time domain position, time density, and presence of the PTRS may be the same as the parameter in the repetition without segmentation. For example, the parameter for at least one of the time domain position, time density, and presence of the PTRS in the repetition with segmentation may be determined from transmission parameters obtained before division into a plurality of transmissions due to crossing of the slot boundary.

<<Time Domain Position Determination Method 1-2>>

The parameter for at least one of the time domain position, time density, and presence of the PTRS may be determined based on at least one of the MCS index or modulation order of the repetition without segmentation and the higher layer parameter (at least one of the threshold (ptrs-MCS$_i$ (i=1, 2, 3)), the time density (timeDensity), and the presence of time density (timeDensity)).

<<Frequency Domain Position>>

At least one of the UE and the base station may determine a parameter for at least one of the frequency domain position, frequency density, and presence of the PTRS in the repetition with segmentation in accordance with at least one of frequency domain position determination methods 1-1 and 1-2 described below.

<<Frequency Domain Position Determination Method 1-1>>

The parameter for at least one of the frequency domain position, frequency density, and presence of the PTRS may be the same as the parameter in the repetition without segmentation. For example, the parameter for at least one of the frequency domain position, frequency density, and presence of the PTRS in the repetition with segmentation may be determined from transmission parameters obtained before division into a plurality of transmissions due to crossing of the slot boundary.

<<Frequency Domain Position Determination Method 1-2>>

The parameter for at least one of the frequency domain position, frequency density, and presence of the PTRS may be determined based on at least one of the bandwidth (the number of PRBs) and the higher layer parameter (at least one of N_Rbi (i=0, 1), the frequency density (frequencyDensity), and the presence of frequency density (frequencyDensity)), for the repetition without segmentation.

Figure 3:
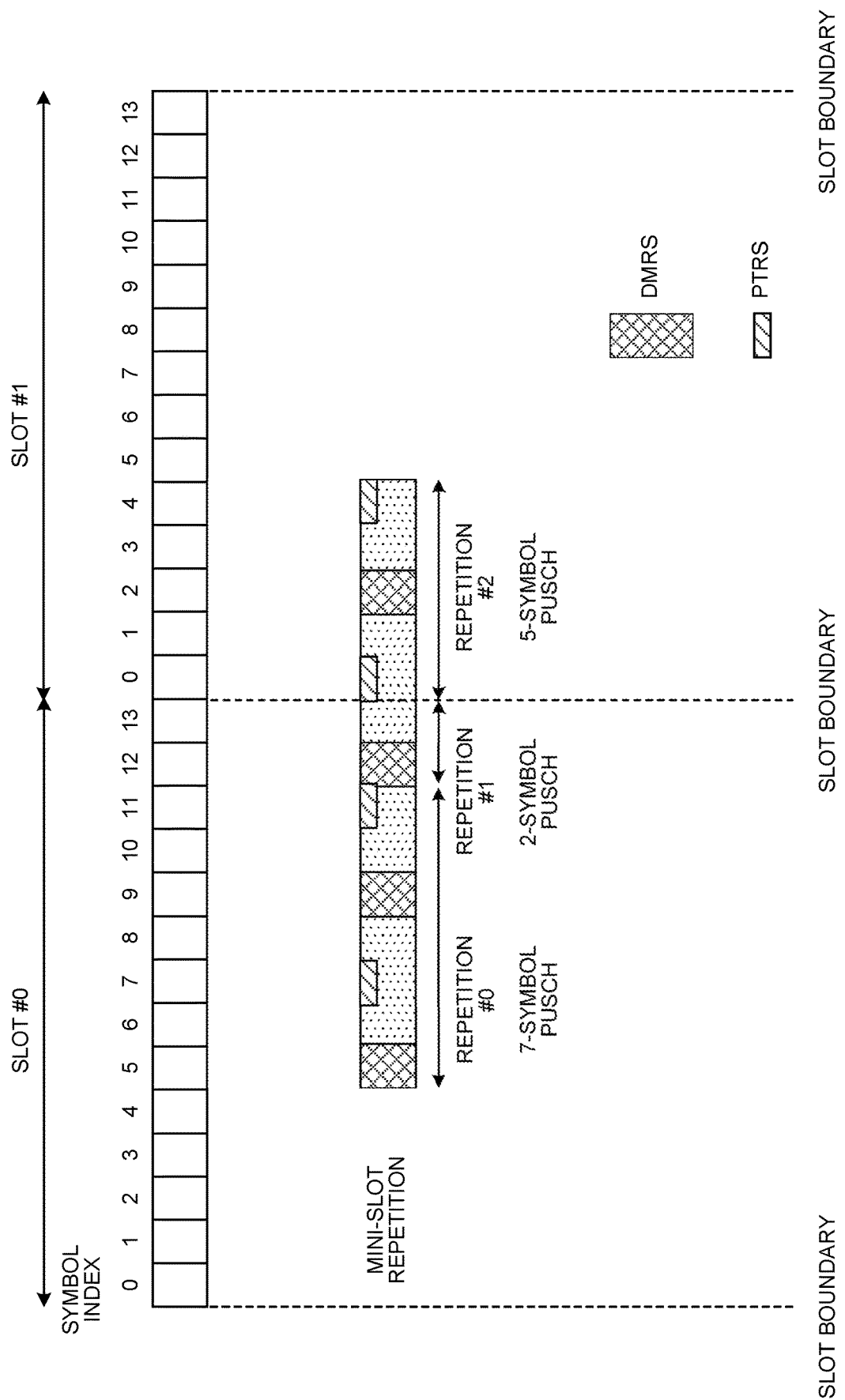
FIG. 3 is a diagram to show an example of multi-segment transmission according to Embodiment 1.

For example, as shown in FIG. 3, the UE may transmit repetition #0 without segmentation and repetitions #1 and #2 with segmentation as in the case of FIG. 2. The PTRS position in the time domain and frequency domain of the repetition with segmentation (repetitions #1 and #2) may be the same as the PTRS position in the time domain and frequency domain of the repetition without segmentation (repetition #0). Similarly, the DMRS position in the time domain and frequency domain of the repetition with segmentation (repetitions #1 and #2) may be the same as the DMRS position in the time domain and frequency domain of the repetition without segmentation (repetition #0).

<<Other Parameters>>

Association between a UL PTRS port and a DMRS port in the repetition with segmentation may be the same as association between the UL PTRS port and the DMRS port in the repetition without segmentation. The association between the UL PTRS port and the DMRS port in the repetition without segmentation may be indicated by a PTRS-DMRS association field in the DCI (for example, a DCI format for scheduling of the PUSCH or DCI format 0_1).

For non-codebook based UL transmission, the actual number of UL PTRS ports in the repetition with segmentation may be the same as the actual number of UL PTRS ports in the repetition without segmentation. The actual number of UL PTRS ports in the repetition without segmentation may be determined based on a sounding reference signal (SRS) resource index (SRS resource index (SRI)). The SRI may be specified by an SRS Resource Indicator field (SRI field) in the DCI or may be specified by a parameter "srs-ResourceIndicator" included in an RRC information element "ConfiguredGrantConfig" in configured grant PUSCH.

For partial-coherent based UL transmission and non-coherent based UL transmission, the actual number of UL PTRS ports in the repetition with segmentation may be the same as the actual number of UL PTRS ports in the repetition without segmentation. The actual number of UL PTRS ports in the repetition without segmentation may be determined based on at least one of a transmitted rank indicator (TRI, the number of layers) and a transmitted precoding matrix indicator (TPMI). The TRI and the TPMI may be specified based on the precoding information and number of layers field in the DCI (for example, the DCI format for scheduling of the PUSCH or DCI format 0_1), and the association (for example, a table) between the field value, and the TRI and TPMI.

PTRS transmission power in the repetition with segmentation may be the same as PTRS transmission power in the repetition without segmentation. The PTRS transmission power in the repetition without segmentation may be determined based on at least one of the higher layer parameter (UL PTRS power boosting factor (ptrs-Power or $\alpha_{PTRS}^{PUSCH}$)), the PTRS scaling factor ($\beta_{PTRS}$), and the precoding information and number of layers field in the DCI (for example, the DCI format for scheduling of the PUSCH or DCI format 0_1).

Even in a case where the first symbol and the second symbol correspond to different slots due to segmentation, the channel on which the first symbol on the antenna port used for UL transmission is carried may be inferred from the channel on which the second symbol on the antenna port used for UL transmission is carried. In other words, the continuity of phase may be ensured between two slots.

<<Condition>>

Under a particular condition, the PTRS configuration in the repetition with segmentation may be the same as the PTRS configuration in the repetition without segmentation.

In a case where one repetition is divided into the first segment and the second segment by the slot boundary, the particular condition may be at least one of the following conditions A1 and A2.

<<Condition A1>>

Both the first segment and the second segment include at least one of the DMRS and the PTRS.

<<Condition A2>>

The UE does not expect that the second segment is scheduled or configured not to include at least one of the DMRS and the PTRS.

<<Collision between PTRS and DMRS>>

In regard to a case where the PTRS collides with the DMRS associated one segment, the UE may follow at least one of operations A1 to A5 described below.

[Operation A1]

The UE may drop the PTRS (need not transmit the PTRS).

[Operation A2]

The UE may puncture the PTRS in a resource element (RE) for the DMRS.

[Operation A3]

The UE may perform at least one of shifting and postponement of the PTRS. The UE may move the PTRS to a resource that does not overlap the resource for the DMRS in at least one of the time domain and the frequency domain.

[Operation A4]

The UE need not expect that the PTRS collides with the DMRS.

[Operation A5]

Processing executed in a case where the PTRS collides with the DMRS associated one segment may be left to a UE implementation.

Note that in Rel. 15, the PTRS is mapped to a symbol with no DMRS.

According to this embodiment, the PTRS configuration in the repetition with segmentation is based on the PTRS in the repetition without segmentation, allowing the processing in the UE to be simplified. This suppresses an increase in loads.

Embodiment 2

PTRS configuration in the repetition with segmentation (a plurality of segment) may be different from the PTRS configuration for the repetition without segmentation. The value of the particular parameter in the repetition with segmentation may be different from the value of the parameter for the PTRS for the repetition without segmentation. At least one of the UE and the base station may determine a value different from the value of the particular parameter for the PTRS for the repetition without segmentation, as the value of the particular parameter in the repetition with segmentation.

For example, at least one of the UE and the base station may apply the PTRS configuration to each segment by considering each segment to be an independent PUSCH (repetition).

<<Sequence>>

At least one of the UE and the base station may determine the PTRS sequence in the repetition with segmentation in accordance with at least one of PTRS sequence determination methods 2-1 and 2-2 described below.

[PTRS Sequence Determination Method 2-1]

The PTRS sequence may be determined based on the preceding or succeeding repetition (the index of the segment, for example, the preceding or succeeding slot). The PTRS sequence in one of two segments may be determined based on the PTRS sequence in the other segment. For example, in a case where the repetition is divided into a first segment and a second segment by the slot boundary, the PTRS sequence in the second segment of the slot $n_{s,f}^\mu$ may be based on the PTRS sequence in the first segment of the slot $n_{s,f}^\mu - 1$ (the PTRS sequences may be the same), and the PTRS sequence in the first segment of the slot $n_{s,f}^\mu$ may be based on the PTRS sequence in the second segment of the slot $n_{s,f}^\mu + 1$ (the PTRS sequences may be the same).

[PTRS Sequence Determination Method 2-2]

Each PTRS sequence may be determined based on the corresponding slot. For example, an equation for generation of a PTRS sequence may include the slot number $n_{s,f}^\mu$. The PTRS sequence in the repetition with segmentation may vary with slot (segment). The equation for generation of a PTRS sequence in the repetition with segmentation may be the same as the equation for generation of a PTRS sequence in the repetition without segmentation. The equation for generation of a PTRS sequence in the repetition with segmentation may be different from the equation for generation of a PTRS sequence in the repetition without segmentation.

<<Time Domain Position>>

The parameter for at least one of the time domain position, time density, and presence of the PTRS in the repetition with segmentation may be determined based on at least one of the MCS index or modulation order and the higher layer parameter.

In a case where the MCS index or the modulation order varies between segments, at least one of the UE and the base station may determine a parameter for at least one of the time domain position, time density, and presence of the PTRS in the repetition with segmentation in accordance with at least one of time domain position determination methods 2-1 and 2-2 described below.

<<Time Domain Position Determination Method 2-1>>

The parameter for at least one of the time domain position, time density, and presence of the PTRS may be determined based on at least one of the MCS index or modulation order and the higher layer parameter (at least one of the threshold (ptrs-MCS$_i$ (i=1, 2, 3)), the time density (timeDensity), and the presence of time density (timeDensity)) for the preceding or succeeding segment.

<<Time Domain Position Determination Method 2-2>>

The parameter for at least one of the time domain position, time density, and presence of the PTRS may be determined based on at least one of the MCS index or modulation order and the higher layer parameter (at least one of the threshold (ptrs-MCS$_i$ (i=1, 2, 3)), the time density (timeDensity), and the presence of time density (timeDensity)), configured for each segment.

The higher layer parameter for the repetition with segmentation may be provided for at least one of the segmented PUSCH and each segment. The value of the higher layer parameter for the repetition with segmentation may be different from the value of the higher layer parameter for the repetition without segmentation.

<<Frequency Domain Position>>

The parameter for at least one of the frequency domain position, frequency density, and presence of the PTRS in the repetition with segmentation may be determined based on at least one of the bandwidth (the number of PRBs) and the higher layer parameter.

In a case where the bandwidth (the number of PRBs) is different between the segments, at least one of the UE and the base station may determine the parameter for at least one of the frequency domain position, frequency density, and presence of the PTRS in the repetition with segmentation in accordance with at least one of frequency domain position determination methods 2-1 and 2-2 described below.

<<Frequency Domain Position Determination Method 2-1>>

The parameter for at least one of the frequency domain position, frequency density, and presence of the PTRS may be determined based on at least one of the bandwidth (the number of PRBs) and the higher layer parameter (at least one of N_Rbi (i=0, 1), the frequency density (frequencyDensity), and the presence of frequency density (frequencyDensity)) for the preceding or succeeding segment.

<<Frequency Domain Position Determination Method 2-2>>

The parameter for at least one of the frequency domain position, frequency density, and presence of the PTRS may be determined based on at least one of the bandwidth (the number of PRBs) and the higher layer parameter (at least one of N_Rbi (i=0, 1), the frequency density (frequencyDensity), and the presence of frequency density (frequencyDensity)) for each segment.

The higher layer parameter for the repetition with segmentation may be provided for at least one of the segmented PUSCH and each segment. The value of the higher layer parameter for the repetition with segmentation may be different from the value of the higher layer parameter for the repetition without segmentation.

Figure 4:
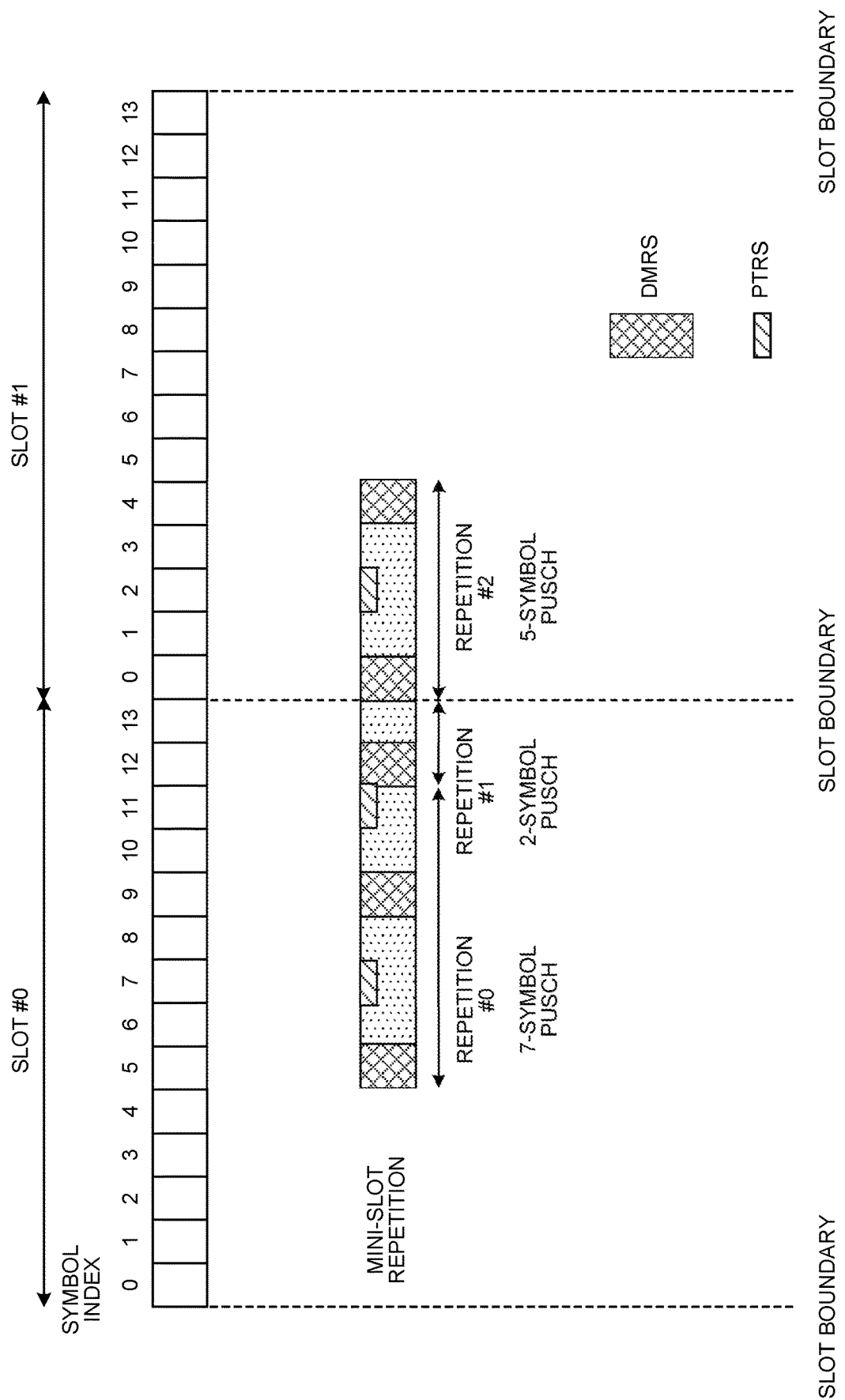
FIG. 4 is a diagram to show an example of multi-segment transmission according to Embodiment 2.

For example, as shown in FIG. 4, the UE may transmit repetition #0 without segmentation and repetitions #1 and #2 with segmentation as in the case of FIG. 2. The PTRS position in the time domain and frequency domain of the repetition with segmentation (repetitions #1 and #2) may be different from the PTRS position in the time domain and frequency domain of the repetition without segmentation (repetition #0). Similarly, the DMRS position in the time domain and frequency domain of the repetition with segmentation (repetitions #1 and #2) may be different from the DMRS position in the time domain and frequency domain of the repetition without segmentation (repetition #0).

<<Other Parameters>>

The association between the UL PTRS port and the DMRS port in the repetition with segmentation may be indicated by the PTRS-DMRS association field in the DCI (for example, the DCI format for scheduling of the PUSCH or DCI format 0_1). The association between the UL PTRS port and the DMRS port in the repetition with segmentation may be different from the association between the UL PTRS port and the DMRS port in the repetition without segmentation.

For the non-codebook based UL transmission, the actual number of UL PTRS ports in the repetition with segmentation may be determined based on the SRI. The actual number of UL PTRS ports in the repetition with segmentation may be different from the actual number of UL PTRS ports in the repetition without segmentation.

For the partial-coherent based UL transmission and non-coherent based UL transmission, the actual number of UL PTRS ports in the repetition with segmentation may be determined based on at least one of the TRI and the TPMI. The actual number of UL PTRS ports in the repetition with segmentation may be different from the actual number of UL PTRS ports in the repetition without segmentation.

The PTRS transmission power in the repetition with segmentation may be determined based on at least one of the higher layer parameter (UL PTRS power boosting factor (ptrs-Power or $\alpha_{PTRS}^{PUSCH}$)), the PTRS scaling factor ($\beta_{PTRS}$), and the precoding information and number of layers field in the DCI (for example, the DCI format for scheduling of the PUSCH or DCI format 0_1). The PTRS transmission power in the repetition with segmentation may be different from the PTRS transmission power in the repetition without segmentation.

According to this embodiment, at least one of the UE and the base station can determine the PTRS configuration suitable for the repetition with segmentation.

Embodiment 3

In a case where one transmission is divided into a plurality of segments, the PTRS transmission in the segments need not be supported. Even in a case where the PTRS is configured to be transmitted on the PUSCH, the PTRS need not be transmitted on the segmented PUSCH.

According to this embodiment, the PTRS is not used for the multi-segment transmission. This enables the processing in the UE to be simplified, allowing suppression of an increase in loads.

Embodiment 4

The PTRS configuration may be determined based on the length of the overall transmission (all repetitions or the overall PUSCH). Alternatively, the PTRS configuration may be determined based on the length of the overall transmission in each slot (repetitions in each slot or the overall PUSCH).

Figure 5:
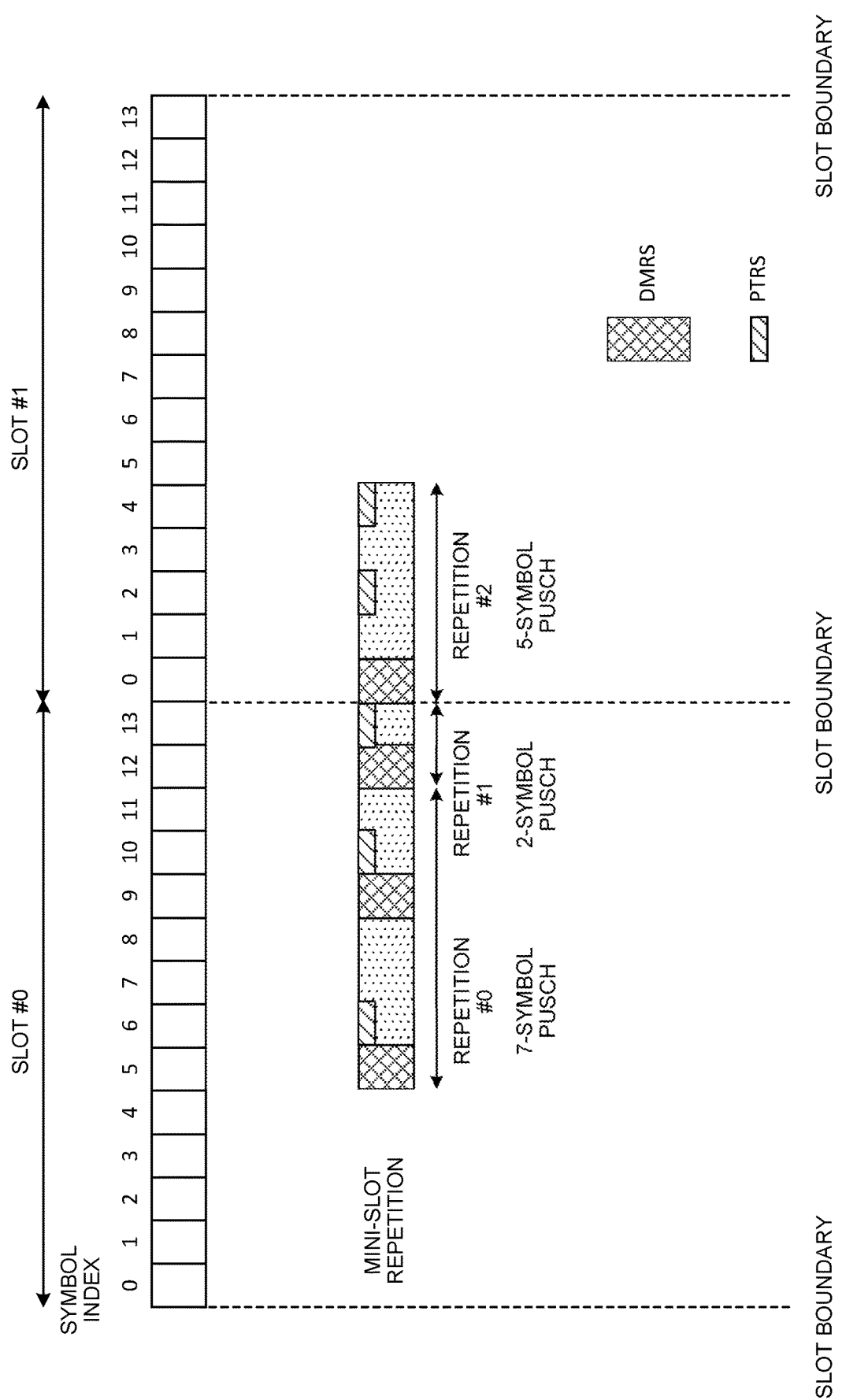
FIG. 5 is a diagram to show an example of multi-segment transmission according to Embodiment 4.

For example, as shown in FIG. 5, the UE may transmit repetition #0 without segmentation and repetitions #1 and #2 with segmentation as in the case of FIG. 2. In a case where all of the repetitions (#0 to #2) are 14 symbols in length, the PTRS position in the time domain and the frequency domain may be determined based on 14 symbols (by considering the PTRS to be a 14-symbol PUSCH). The density in the time domain and the frequency domain may be determined based on a particular MCS. The particular MCS may be an MCS indicated for the first repetition, an average MCS for all the repetitions, or an MCS for the repetition without segmentation, or may be determined based on at least one of the MCS index or modulation order and the higher layer parameter.

According to this embodiment, the PTRS configuration does not depend on the length of the segment. This enables the processing in the UE to be simplified, allowing suppression of an increase in loads.

Embodiment 5

At least one of the UE and the base station may determine a DMRS configuration in the repetition with segmentation (a plurality of segments).

<<Sequence>>

At least one of the UE and the base station may determine a DMRS sequence in the repetition with segmentation in accordance with at least one of DMRS sequence determination methods 1 to 3 described below.

[DMRS Sequence Determination Method 1]

The DMRS sequence in the repetition with segmentation may be determined based on a DMRS sequence in the repetition without segmentation. For example, the DMRS sequence in the repetition with segmentation may be determined from transmission parameters obtained before division into a plurality of transmissions due to crossing of the slot boundary.

[DMRS Sequence Determination Method 2]

The DMRS sequence may be determined based on the preceding or succeeding repetition (the index of the segment, for example, the preceding or succeeding slot). The DMRS sequence in one of two segments may be determined based on the DMRS sequence in the other segment. For example, in a case where the repetition is divided into a first segment and a second segment by the slot boundary, the DMRS sequence in the second segment of the slot $n_{s,f}^{\mu}$ may be based on the DMRS sequence in the first segment of the slot $n_{s,f}^{\mu}-1$ (the DMRS sequences may be the same), and the DMRS sequence in the first segment of the slot $n_{s,f}^{\mu}$ may be based on the DMRS sequence in the second segment of the slot $n_{s,f}^{\mu}+1$ (the DMRS sequences may be the same).

[DMRS Sequence Determination Method 3]

The DMRS sequence may be determined based on each slot. For example, an equation for generation of a DMRS sequence may include the slot number $n_{s,f}^{\mu}$. The DMRS sequence in the repetition with segmentation may vary with slot (segment). The equation for generation of a DMRS sequence in the repetition with segmentation may be the same as the equation for generation of a DMRS sequence in the repetition without segmentation. The equation for generation of a DMRS sequence in the repetition with segmentation may be different from the equation for generation of a DMRS sequence in the repetition without segmentation.

For example, the UE may map the DMRS to resources for the PUSCH as shown in FIG. 3 as described above.

<<Double Symbol DMRS>>

The UE may follow at least one of operations B1 to B5 described below for a double-symbol DMRS (in a case where the maximum length (higher layer parameter max-Length) within a UL DMRS configuration (DMRS-UplinkConfig) is 2 (len2), the DMRS in two consecutive symbols).

[Operation B1]

The UE need not expect that the maximum length within the UL DMRS configuration is 2.

[Operation B2]

The UE need not expect that the double symbol DMRS crosses the slot boundary.

[Operation B3]

The DMRS sequence may be determined based on the preceding or succeeding repetition (the other symbol, the index of the segment, for example, the preceding or succeeding slot). For double symbol DMRS spanning two segments, the DMRS sequence in one of the two segments may be determined based on the DMRS sequence in the other segment. For example, in a case where the repetition (double symbol DMRS) is divided into a first segment (first symbol) and a second segment (second symbol) by the slot boundary, the DMRS sequence in the second segment of the slot $n_{s,f}^{\mu}$ may be based on the DMRS sequence in the first segment of the slot $n_{s,f}^{\mu}-1$ (the DMRS sequences may be the same), and the DMRS sequence in the first segment of the slot $n_{s,f}^{\mu}$ may be based on the DMRS sequence in the second segment of the slot $n_{s,f}^{\mu}+1$ (the DMRS sequences may be the same).

[Operation B4]

The DMRS sequence may be determined based on each slot. For example, an equation for generation of a DMRS sequence may include the slot number $n_{s,f}^{\mu}$. The DMRS sequence in the repetition with segmentation may vary with slot (segment). The equation for generation of a DMRS sequence in the repetition with segmentation may be the same as the equation for generation of a DMRS sequence in the repetition without segmentation.

Figure 6:
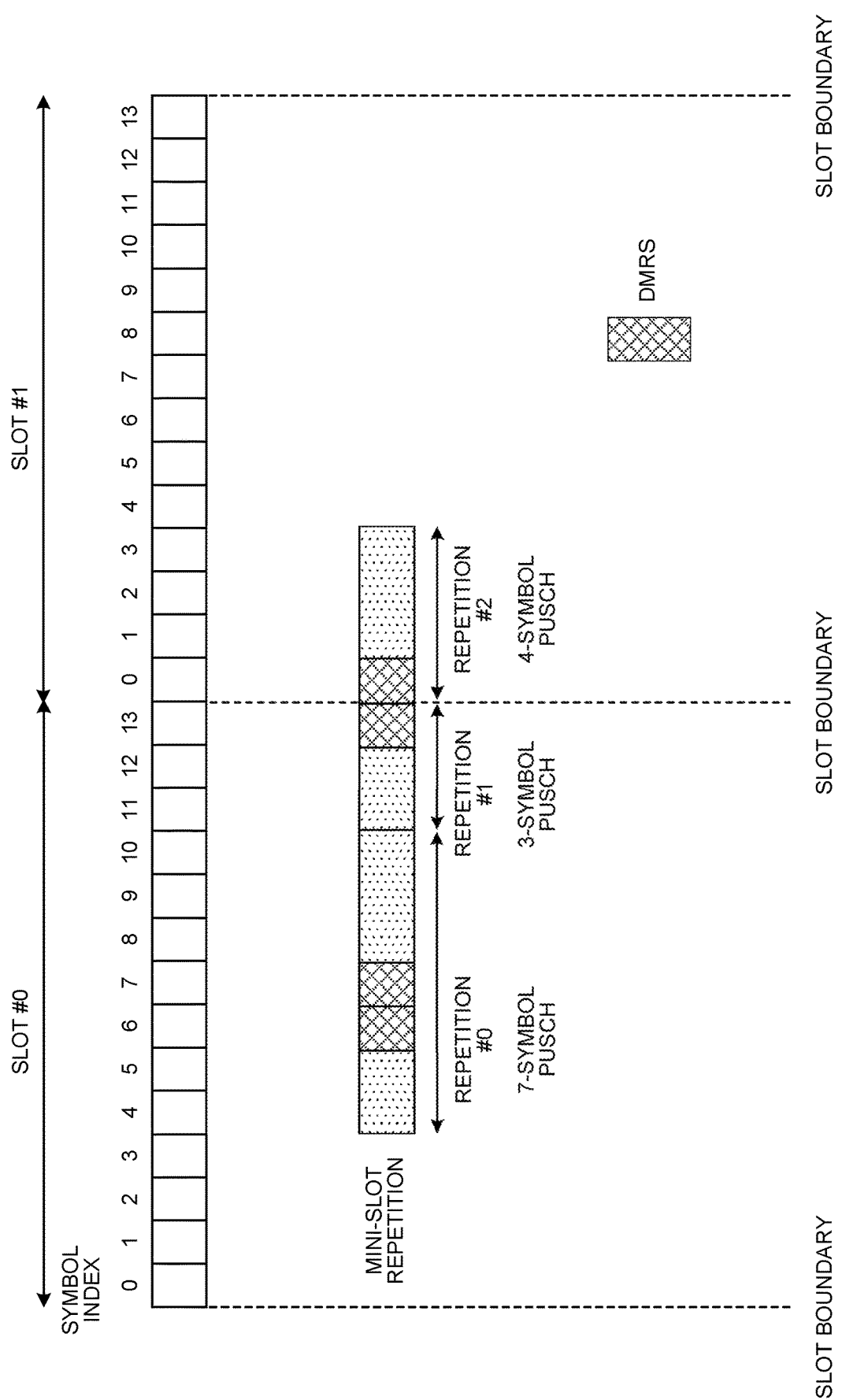
FIG. 6 is a diagram to show an example of multi-segment transmission according to Embodiment 6.

As shown in FIG. 6, it is assumed that a double symbol DMRS is configured for the PUSCH and that the repetition succeeding repetition #0 over symbols #4 to #10 in slot #0 is divided into repetition #1 over symbols #11 to #13 in slot #0 and repetition #2 over symbols #0 to #3 in slot #1. The double symbol DMRS is allocated from symbol #13 in slot #0 to symbol #0 in slot #1. For example, the UE may generate a DMRS sequence mapped to symbol #13 in slot #0 based on slot number n and generate a DMRS sequence mapped to symbol #0 in slot #1 based on slot number n+1.

[Operation B5]

It may be assumed that the same value of a time domain (TD)-orthogonal cover code (OCC) is inevitably applied to the first symbol and the second symbol of the double symbol DMRS.

For DMRS configuration type 1, the antenna port p may be any one of 0 to 3. As shown in FIG. 7, in a case where the antenna port is any one of 0 to 3, the TD-OCC has an equal value in the first symbol and in the second symbol.

For DMRS configuration type 2, the antenna port p may be any one of 0 to 5. As shown in FIG. 8, in a case where the antenna port is any one of 0 to 5, the TD-OCC has an equal value in the first symbol and in the second symbol.

<<Condition>>

Under a particular condition, the DMRS configuration in the repetition with segmentation may be the same as the DMRS configuration in the repetition without segmentation. Under a particular condition, the DMRS sequence in the repetition with segmentation may be the same as the DMRS sequence in the repetition without segmentation.

In a case where one repetition is divided into the first segment and the second segment by the slot boundary, the particular condition may be at least one of the following conditions B1 and B2.

<<Condition B1>>

Both the first segment and the second segment include at least one of the DMRS and the PTRS.

<<Condition B2>>

The UE does not expect that the second segment is scheduled or configured not to include at least one of the DMRS and the PTRS.

According to this embodiment, the UE can appropriately transmit the DMRS in multi-segment.

Other Embodiments

The embodiments described above may be applied to UL transmission that is not repetitive. For example, the UL transmission may be PUSCH transmission across the slot boundary.

One UL transmission may be divided into two segments by a non-UL portion (for example, a DL portion), based on the TDD configuration.

The embodiments described above may be applied to UL transmission across the non-UL portion (for example, PUSCH repetition).

Different values or different operations in the several embodiments described above may be applied to two respective segments resulting from division by at least one of the slot boundary and the non-UL portion.

The following may be interchangeably interpreted: PUSCH repetition, a plurality of PUSCHs over slots or sub-slots or mini-slots, PUSCH blind retransmission, PUSCH in a plurality of slots or in a plurality of sub-slots or in a plurality of mini-slots, a plurality of PUSCHs including the same TB, and repetition of TBs over a plurality of slots or over a plurality of sub-slots or over a plurality of mini-slots.

In the embodiments described above, instead of DCI format 0_1, another DCI format (for example, the DCI format used to schedule the PUSCH) may be used.

The value of a first parameter for the PTRS in the repetition with segmentation may be the same as the value of a first parameter for the PTRS in the repetition without segmentation, and the value of a second parameter for the DMRS in the repetition with segmentation may be the same as the value of a second parameter for the DMRS in the repetition without segmentation.

The value of the first parameter for the PTRS in the repetition with segmentation may be different from the value of the first parameter for the PTRS in the repetition without segmentation, and the value of the second parameter for the DMRS in the repetition with segmentation may be different from the value of the second parameter for the DMRS in the repetition without segmentation.

The value of the first parameter for the PTRS in the repetition with segmentation may be the same as the value of the first parameter for the PTRS in the repetition without segmentation, and the value of the second parameter for the DMRS in the repetition with segmentation may be different from the value of the second parameter for the DMRS in the repetition without segmentation.

The value of the first parameter for the PTRS in the repetition with segmentation may be different from the value of the first parameter for the PTRS in the repetition without segmentation, and the value of the second parameter for the DMRS in the repetition with segmentation may be the same as the value of the second parameter for the DMRS in the repetition without segmentation.

The equation for generation of a PTRS sequence in the repetition with segmentation may be the same as the equation for generation of a DMRS sequence in the repetition with segmentation. The equation for generation of a PTRS sequence in the repetition with segmentation may be different from the equation for generation of a DMRS sequence in the repetition with segmentation.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
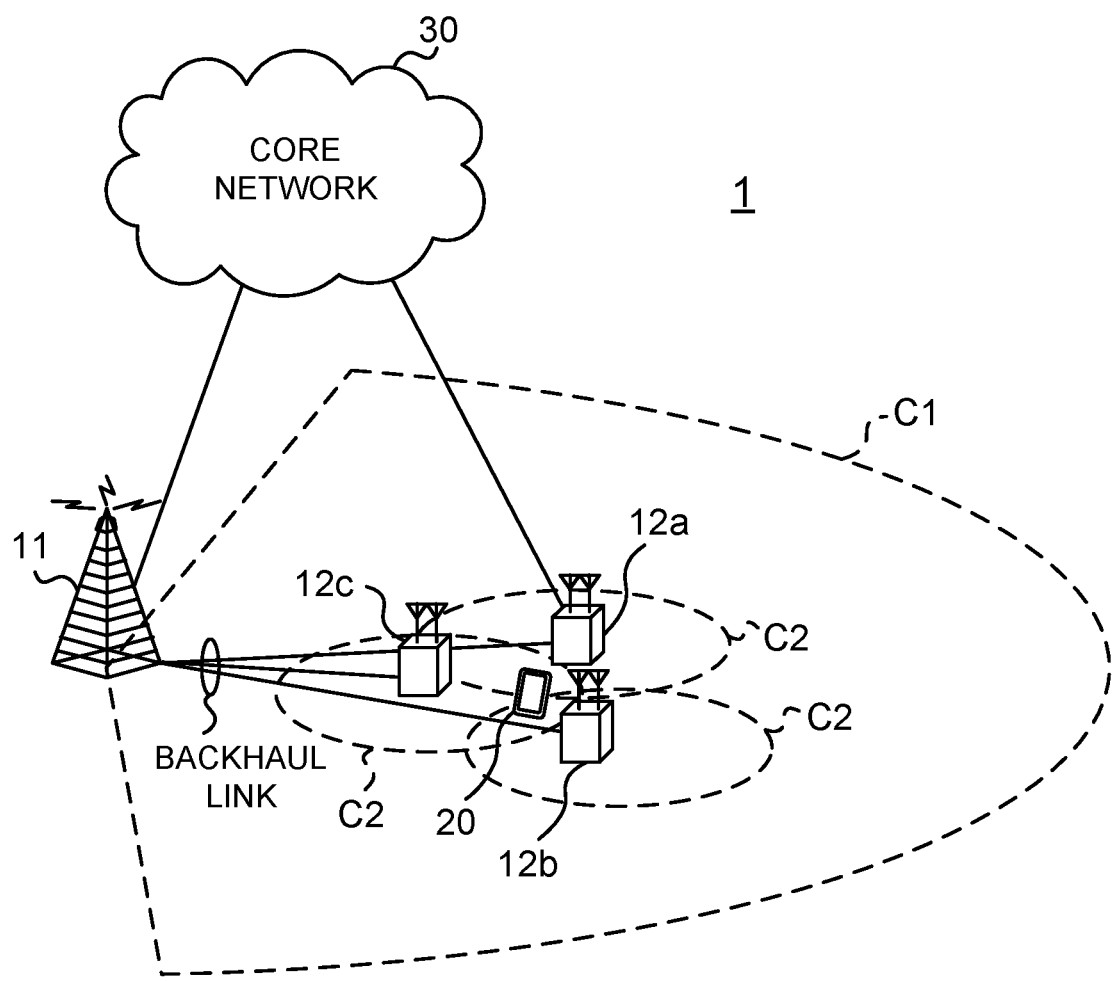
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
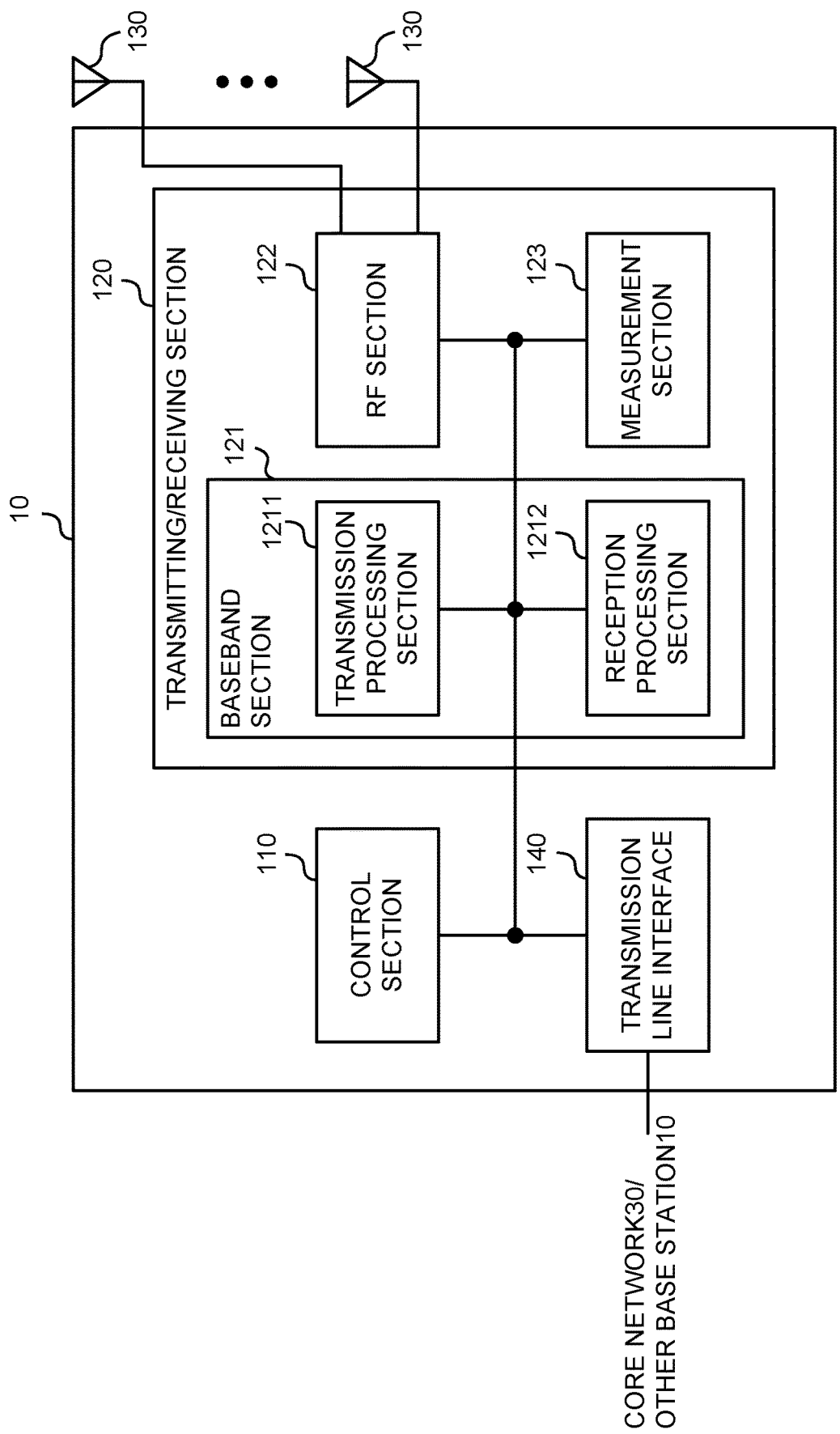
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the control section 110 may receive the phase tracking reference signal (PTRS) for the uplink control channel (PUCCH) from the user terminal 20. The control section 110 may reduce (correct) phase noise in the PUCCH based on the PTRS.

(User Terminal)

Figure 11:
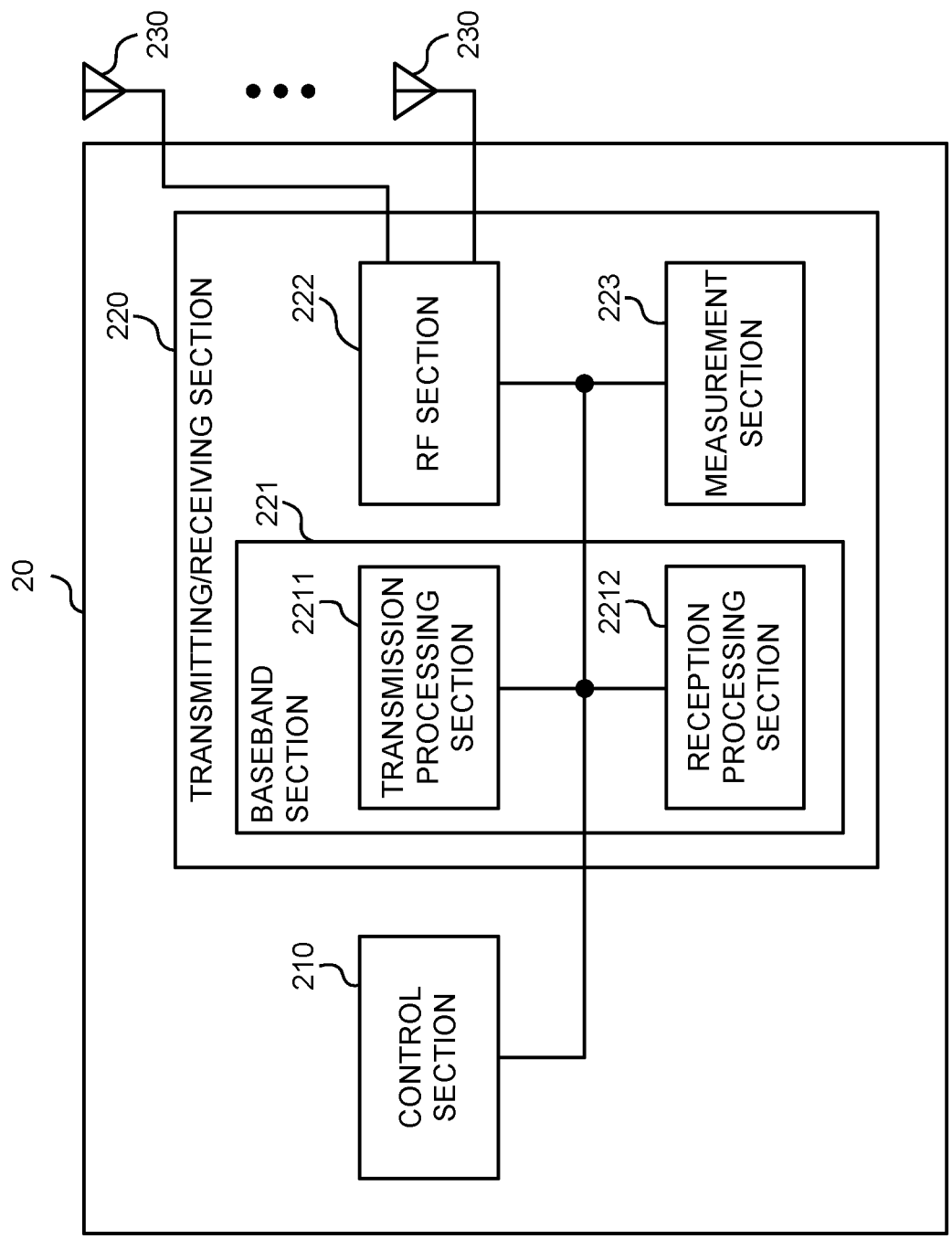
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

In a case where the physical uplink shared channel (PUSCH) spans two durations (for example, slots, sub-slots, mini-slots, or the like) across the boundary in the time domain (for example, the boundary between the slots, sub-slots, mini-slots, or the like) (with segmentation), the control section 210 may determine the configuration of the phase tracking reference signal (PTRS) during each of the two durations. The transmitting/receiving section 220 may transmit the PUSCH.

The control section 210 may use the parameter for the PTRS for a case where the PUSCH does not cross the boundary (without segmentation) to determine the parameter for the PTRS during each of the two durations.

In a case where the reference signal on the PUSCH satisfies a condition, the control section may use the parameter for the PTRS for the case where the PUSCH does not cross the boundary to determine the parameter for the PTRS during each of the two durations.

A value of the parameter for the PTRS during each of the two durations may be different from a value of the parameter for the PTRS for the case where the PUSCH does not cross the boundary.

The transmitting/receiving section 220 may determine not to transmit the PTRS during the two durations.

In a case where the physical uplink shared channel (PUSCH) spans two durations (for example, slots, sub-slots, mini-slots, or the like) across the boundary in the time domain (for example, the boundary between the slots, sub-slots, mini-slots, or the like), the control section 210 may determine the sequence of the demodulation reference signal (DMRS) during each of the two durations. The transmitting/receiving section 220 may transmit the PUSCH.

The control section 210 may determine the DMRS sequence during each of the two durations by using at least one of a DMRS sequence for a case where the PUSCH does not cross the boundary and an index for at least one of the two durations.

The transmitting/receiving section 220 may transmit a 2-symbol DMRS (double symbol DMRS) that is continuous across the boundary.

The control section 210 may apply an identical value of an orthogonal cover code in a time domain to the 2-symbol DMRS.

The transmitting/receiving section 220 need not transmit the 2-symbol DMRS that is continuous across the boundary.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
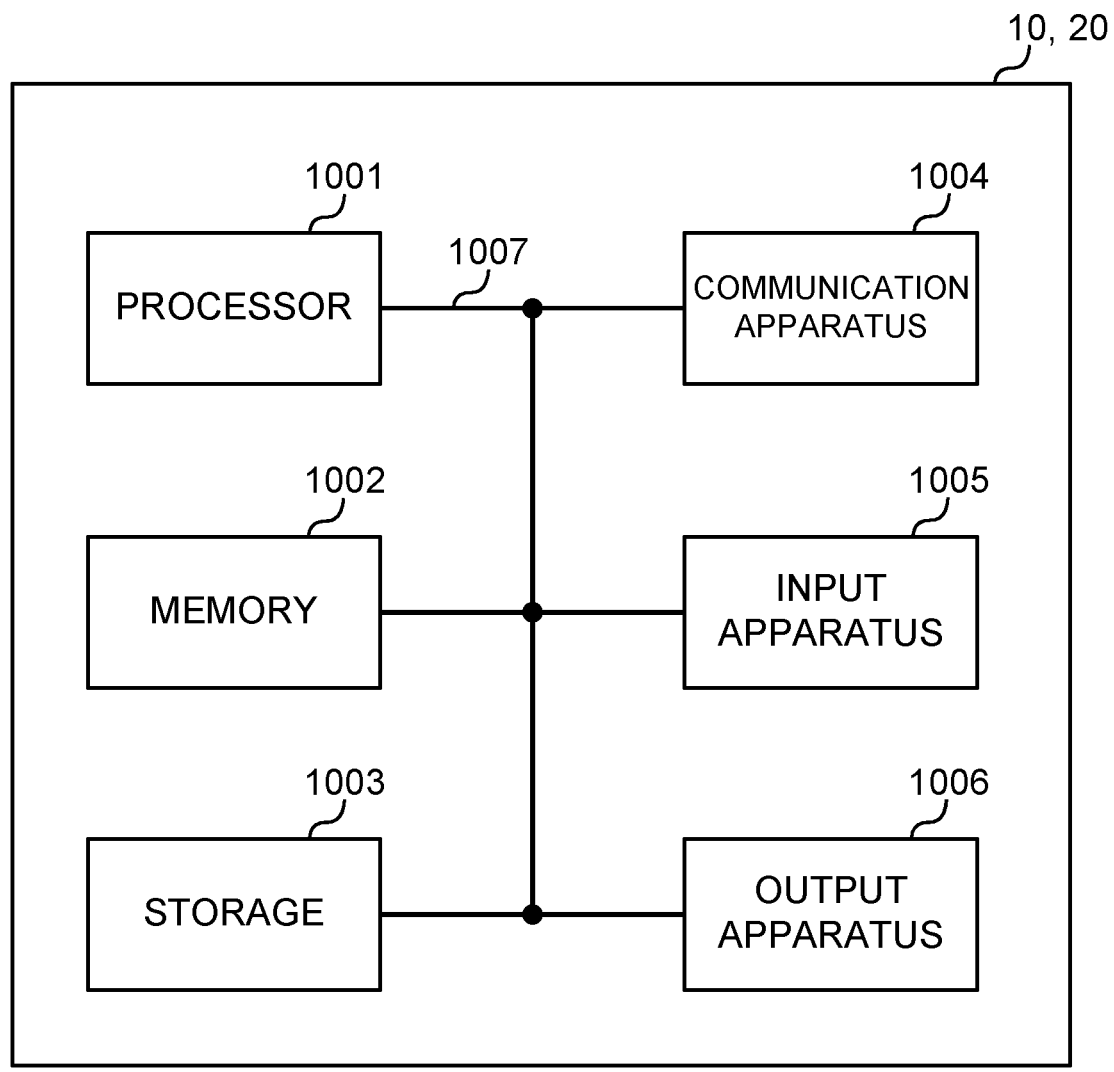
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of durations (frames) in the time domain. Each of one or a plurality of durations (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter duration than 1 ms (for example, 1 to 13 symbols), or may be a longer duration than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a processor that, when a physical uplink shared channel (PUSCH) is allocated over a plurality of slots and is divided into two segments by a slot boundary, or when the PUSCH is divided into the two segments by a duration indicated as a downlink (DL), determines a phase tracking reference signal (PTRS) configuration in each of the two segments; and
   a transmitter that transmits the PUSCH.

2. The terminal according to claim 1, wherein the PUSCH is a repetition transmission of a transport block (TB).

3. The terminal according to claim 1, wherein the PUSCH is divided into the two segments by the duration indicated as the DL based on a time division duplex (TDD) configuration.

4. The terminal according to claim 2, wherein the PUSCH is divided into the two segments by the duration indicated as the DL based on a time division duplex (TDD) configuration.

5. A radio communication method for a terminal, comprising:
   when a physical uplink shared channel (PUSCH) is allocated over a plurality of slots and is divided into two segments by a slot boundary, or when the PUSCH is divided into the two segments by a duration indicated as a downlink (DL), determining a phase tracking reference signal (PTRS) configuration in each of the two segments; and
   transmitting the PUSCH.

6. A base station comprising:
   a processor that, when a physical uplink shared channel (PUSCH) is allocated over a plurality of slots and is divided into two segments by a slot boundary, or when the PUSCH is divided into the two segments by a duration indicated as a downlink (DL), determines a phase tracking reference signal (PTRS) configuration in each of the two segments; and
   a receiver that receives the PUSCH.

7. A system comprising a terminal and a base station, wherein
   the terminal comprises:
      a processor that, when a physical uplink shared channel (PUSCH) is allocated over a plurality of slots and is divided into two segments by a slot boundary, or when the PUSCH is divided into the two segments by a duration indicated as a downlink (DL), determines a phase tracking reference signal (PTRS) configuration in each of the two segments; and
      a transmitter that transmits the PUSCH, and
   the base station comprises:
      a receiver that receives the PUSCH.

* * * * *